United States Patent
Schröder

(10) Patent No.: US 8,387,779 B2
(45) Date of Patent: Mar. 5, 2013

(54) METHOD FOR FILLING BULK MATERIAL

(75) Inventor: Detlev Schröder, Dinslaken (DE)

(73) Assignee: Thyssenkrupp Fördertechnik GmbH, Essen (DE)

( * ) Notice: Subject to any disclaimer, the term of this patent is extended or adjusted under 35 U.S.C. 154(b) by 382 days.

(21) Appl. No.: 12/597,067

(22) PCT Filed: Mar. 12, 2008

(86) PCT No.: PCT/EP2008/001940
§ 371 (c)(1),
(2), (4) Date: Oct. 22, 2009

(87) PCT Pub. No.: WO2008/138418
PCT Pub. Date: Nov. 20, 2008

(65) Prior Publication Data
US 2011/0203905 A1    Aug. 25, 2011

(30) Foreign Application Priority Data

May 10, 2007   (DE) .......................... 10 2007 022 388

(51) Int. Cl.
*B65G 37/00* (2006.01)
(52) U.S. Cl. ................... 198/602; 198/617; 198/508
(58) Field of Classification Search ........................ None
See application file for complete search history.

(56) References Cited

U.S. PATENT DOCUMENTS

| | | |
|---|---|---|
| 4,979,781 A | 12/1990 | Bothwell et al. |
| 6,085,890 A | 7/2000 | Kelly et al. |

(Continued)

FOREIGN PATENT DOCUMENTS

| | | |
|---|---|---|
| DE | 2 27 176 | 9/1909 |
| DE | 434 193 | 9/1926 |
| DE | 647 298 C | 7/1937 |
| DE | 1 741 183 | 3/1957 |
| DE | 198 39 744 | 3/2000 |
| DE | 202005013204 | 12/2005 |

(Continued)

OTHER PUBLICATIONS cf. Lehrbuch Fördertechnik [Mechanical Conveying and Handling Manual—Tr.], VEB Berlag Technik Berlin, 1979, open pit mining large devices and universal baggers, pp. 160 to 164.

*Primary Examiner* — Kavel Singh
(74) *Attorney, Agent, or Firm* — McGlew and Tuttle, P.C.

(57) ABSTRACT

A method for filling a terrain using bulk material, preferably excavating material from an ore mine. The method includes a) the terrain has at least three levels disposed parallel to each other; b) a conveyor system (1) by which the bulk material is conveyed is positioned on at least the level second from the bottom; c) a traveling tripper (2) can be displaced along the entire conveyor system (1), by which the bulk material on one or the other side of the conveyor system (1) can be transferred to a connecting conveyor bridge (3) that can also be displaced along the conveyor system (1); d) the connecting conveyor bridge (3) transfers the bulk material to a depositor (4) that can also be displaced along the conveyor system (1); e) the depositor (4) successively deposits the bulk material in elongated filling strips (A-G) on the various levels below and above the level (0) of the conveyor system (1); f) initially one or several levels below or above the level (0) are each filled with at least one strip (A-D or E-G) on one side of the conveyor system (1); and g) the traveling tripper (2), connecting conveyor bridge (3), and the depositor (4) are subsequently displaced to the other side of the conveyor system (1) in order to fill the corresponding filling strip at that location as well.

20 Claims, 2 Drawing Sheets

U.S. PATENT DOCUMENTS

| | | |
|---|---|---|
| 6,782,993 B2 | 8/2004 | Bernard et al. |
| 7,108,124 B2 * | 9/2006 | Bernard et al. ............... 198/617 |
| 7,191,888 B2 * | 3/2007 | Kahrger et al. ............... 198/303 |
| 2003/0136632 A1 | 7/2003 | Bernard et al. |

FOREIGN PATENT DOCUMENTS

| | | |
|---|---|---|
| DE | 102005054840 | 9/2007 |
| GB | 540 688 A | 10/1941 |

* cited by examiner

METHOD FOR FILLING BULK MATERIAL

CROSS REFERENCE TO RELATED APPLICATIONS

This application is a United States National Phase application of International Application PCT/EP2008/001940 and claims the benefit of priority under 35 U.S.C. §119 of German Patent Application DE 10 2007 022 388.0 filed May 10, 2007, the entire contents of which are incorporated herein by reference.

FIELD OF THE INVENTION

The present invention pertains to a method for depositing a terrain with material, and preferably discharge material from an ore mine such as depositing material on the terrain, preferably overburden material from an ore mine.

BACKGROUND OF THE INVENTION

In open pit mining, usually a large amount of overburden material is produced, which is deposited in an adjacent terrain according to a defined system. This terrain frequently has various planes or sloped surfaces. In the method according to the present invention, it is assumed that at least three planes arranged parallel to one another are present. It may also be an entire valley, which shall be filled up entirely over time beginning at a deep level.

SUMMARY OF THE INVENTION

The basic object of the present invention is to propose a method for depositing a terrain with material, in which an extended belt conveyor system for feeding the material has to be moved as little as possible, and otherwise one manages with as few conveying elements as possible.

According to the invention, a method is provided for depositing material on terrain. The method comprises providing that the terrain has at least three terrain planes arranged parallel to one another. A belt conveyor system located on at least the second plane feeds material upwards from below. A traveling tripper is provided for movement along the entire belt conveyor system, with which the material is transferred on one side or the other side of the belt conveyor system to a connecting belt bridge. The belt bridge can also be moved along the belt conveyor system. The connecting belt bridge transfers the material to a stacker which can likewise be moved along the belt conveyor system. The stacker discharges material in extended filling strips one after the other on the various planes below and above the plane of the belt conveyor system. The filling is at first, on one side of the belt conveyor system, a filling of one or more planes below or above the plane of the belt conveyor system with at least one strip. Subsequently, the traveling tripper, connecting belt bridge and stacker are moved to the other side of the belt conveyor system to fill up the corresponding filling strips there as well.

The connecting bridge may advantageously always convey the material largely at right angles (substantially at right angles or at right angles) to the feed direction of the belt conveyor system.

The material may advantageously be conveyed in a dropping or rising manner with the connecting belt bridge.

The stacker may advantageously have at least two sections, whereby a pick-up belt and a discharge belt are connected in the area of a middle moving carriage (centrally located travel structure) to one another in an articulated manner, so that the discharge belt can be pivoted laterally opposite the middle moving carriage and/or can be adjusted in height at the end.

The pick-up belt may advantageously be pivoted laterally opposite the middle moving carriage.

The material may advantageously be always filled on at least two planes on each side of the belt conveyor system.

The filling strips may advantageously be filled up one after the other according to the attached figures.

In the method according to the present invention, conveying elements, which are essentially known per se and which are combined with one another here in an entirely special way, are used to be able to conduct the method according to the present invention. These conveying elements are thus also not described in particular and in detail.

The present invention is explained in detail based on the attached Figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figures 1, 2:
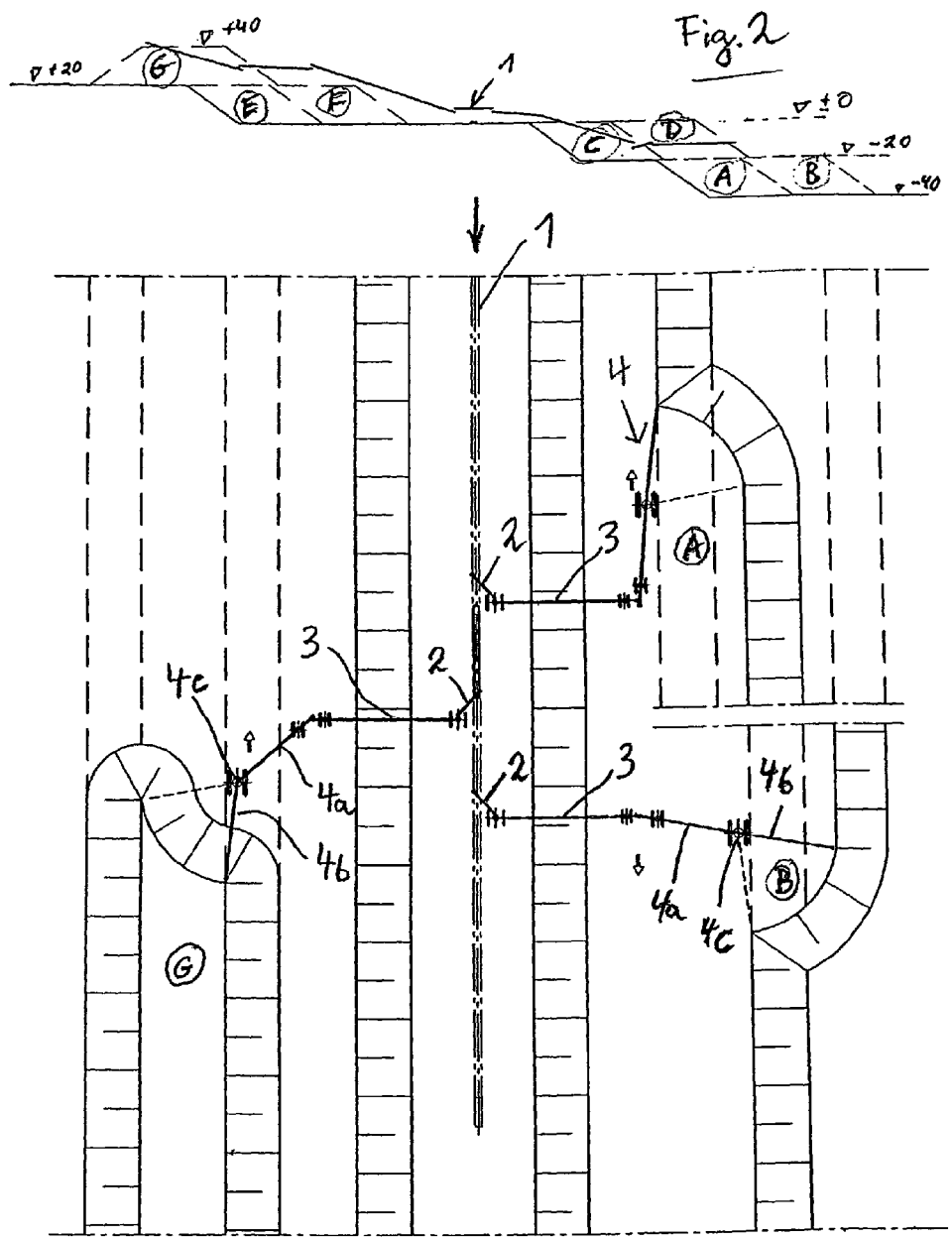
FIG. 1 is a top view showing a cutout of a section of terrain with various positions of conveying elements.
FIG. 2 is a schematic elevation profile of the terrain.

Referring to the drawings in particular, as shown in the figures, the material is conveyed in the direction of the arrow, e.g., from a crushing plant (not shown) via the belt conveyor system 1, a traveling tripper (conveyor loop truck), 2, a connecting belt bridge 3 and then a stacker 4 to the intended planes in order to generate the filling strips A-G one after the other. The belt conveyor system is arranged on a middle plane 0 with the elevation level ±0. The material is filled up on the planes −40 m, −20 m, +20 m and +40 m arranged next to the belt conveyor system 1 one after the other. Thus, this means that each filling strip A-G has a height of ca. 20 m. According to FIGS. 1 and 3 the belt conveyor system 1 is arranged essentially parallel to the individual filling strips A-G. The material is conveyed by the belt conveyor system 1 by means of the traveling tripper 2 to the connecting belt bridge 3 arranged transversely to the belt conveyor system 1. The traveling tripper 2, connecting belt bridge 3 and stacker 4 are moved along the belt conveyor system 1 on moving carriages, which are only shown schematically, whereby the middle moving carriage 4c of the stacker 4 and the moving carriage of the end of the connecting belt bridge 3 facing towards same each travel on the same plane, which may be higher or lower by a plane than the plane of the belt conveyor system 1 and of the moving carriage of the other end of the connecting belt bridge 3 adjacent to same.

A mobile connecting belt bridge is known, e.g., from DE 198 38 744 A1, whereby the feeding side and discharge side of this connecting belt bridge may also be arranged on different elevation planes.

The stacker 4, which consists of a pick-up belt 4a and a discharge belt 4b, which are connected to one another in an articulated manner in the area of the middle moving carriage 4c, is connected to the connecting belt bridge 3. The connecting belt bridge 3 and pick-up belt 4a of the stacker 4 are preferably not connected to one another physically. Their respective motion is controlled by means of permanent position detection and control of the respective moving carriages in a manner known per se in such a way that the transfer of material from the connecting belt bridge 3 to the pick-up belt 4a takes place freely, but always at the site of the pick-up belt intended for this.

The stacker is a conveying element known per se from open pit mining (cf. Lehrbuch Fördertechnik [Mechanical Conveying and Handling Manual—Tr.], VEB Verlag Technik Berlin, 1979, open pit mining large devices and universal baggers, pages 160 to 164). Stackers, in which the pick-up belt and discharge belt are connected in an articulated manner are obvious from this, and a horizontal pivoting is also possible between the pick-up belt and discharge belts.

Figures 3, 4:
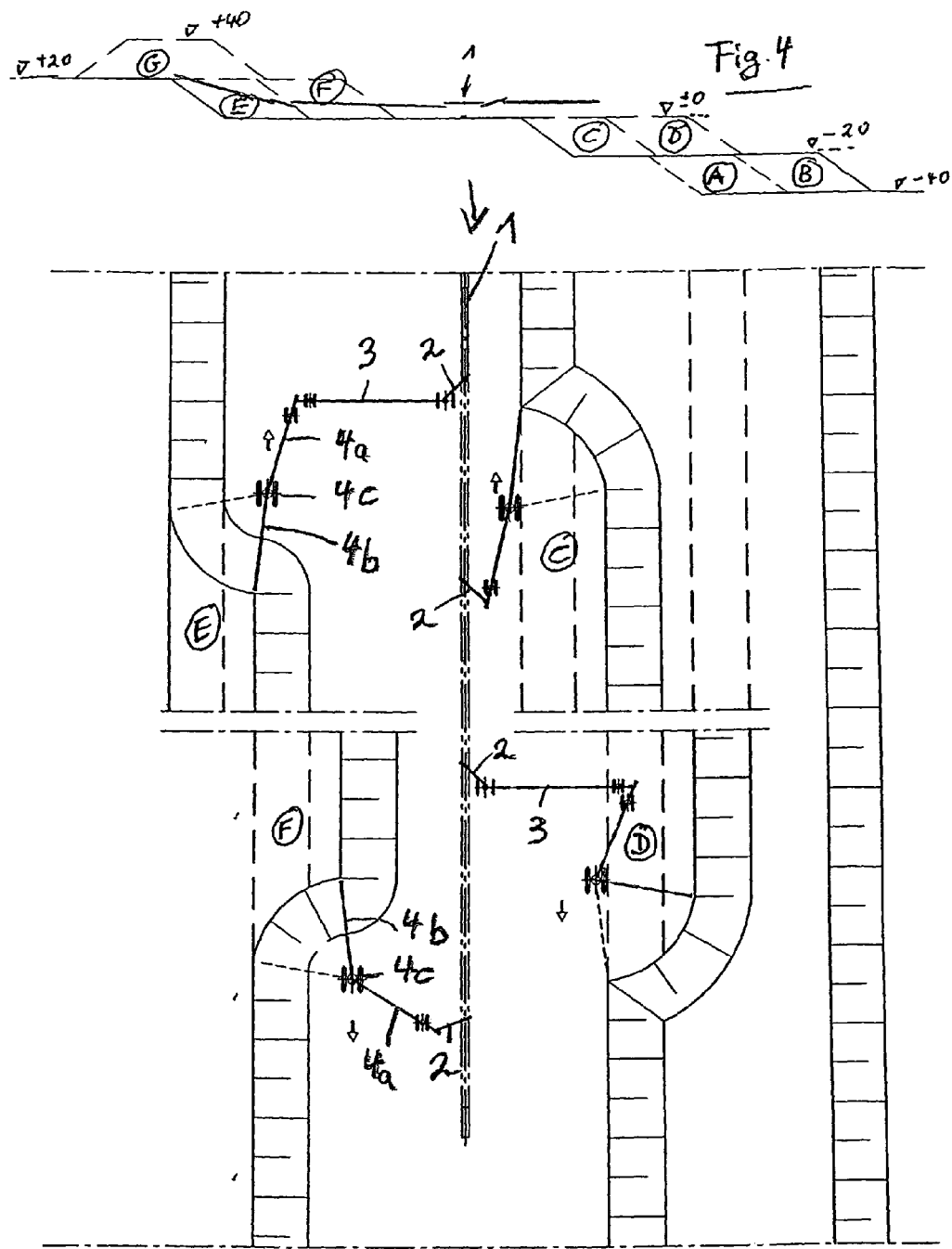
FIG. 3 is a top view showing a cutout of a section of terrain with various positions of conveying elements.
FIG. 4 is a schematic elevation profile of the terrain.

The positions of the conveying means for building up three different filling strips are described in FIG. 1. The filling of the filling strip A, which extends naturally over the entire length of the belt conveyor system 1, is shown in the right top partial area. The same also applies to the right bottom view for filling the filling strip B. Likewise, the positions for filling the filling strips C-F are shown in FIG. 3, while FIG. 1 shows the topmost filling strip G in the left half. In time sequence, the four filling strips A-D are, of course, first filled on one side of the belt conveyor system 1 and then the three filling strips E-G are filled on the other side of the belt conveyor system 1, whereby the filling strips A-G are filled up one after the other. The sequence of the filling is especially obvious from both FIGS. 2 and 4, whereby the different elevation planes −40 m to +40 m are also shown.

It should be pointed out that the belt conveyor system 1 does not have to be moved during the filling of all seven filling strips A-G. This belt conveyor system 1, which is embodied as a shiftable face conveyor, is then moved laterally in a manner known per se and optionally brought to a different elevation level as well.

While specific embodiments of the invention have been described in detail to illustrate the application of the principles of the invention, it will be understood that the invention may be embodied otherwise without departing from such principles.

LIST OF REFERENCE NUMBERS

1 Belt conveyor system (face conveyor)
2 Traveling tripper
3 Connecting belt bridge
4 Stacker
4a Pick-up belt (of 4)
4b Discharge belt (of 4)
4c Middle moving gear (of 4)
A, B, C, D, E, F, G Filling strips
+40 plane 40 m above 0
+20 plane 20 m above 0
±0 plane 0 m (of 1)
−20 plane 20 m below 0
−40 plane 40 m below 0

The invention claimed is:

1. A method for depositing terrain with material, the method comprising:
   a) providing that the terrain has at least 3 planes arranged parallel to one another;
   b) providing a belt conveyor system located on at least the second plane and transporting material from outside the terrain;
   c) providing a traveling tripper for movement along the entire belt conveyor system, with which the material is transferred on one side or the other side of the belt conveyor system to a connecting belt bridge which can also be moved along the belt conveyor system;
   d) using the connecting belt bridge to transfer the material to a stacker which can likewise be moved along the belt conveyor system, said stacker having at least two sections, whereby a pick-up belt and a discharge belt are connected in an area of a middle moving carriage to one another in an articulated manner, so that the discharge belt can be pivoted laterally opposite the middle moving carriage and/or can be adjusted in height at the end, wherein the pick-up belt can be pivoted laterally opposite the middle moving carriage;
   e) discharging the material with the stacker in extended filling strips one after the other on the various planes below and above the plane of the belt conveyor system;
   f) filling at first, on one side of the belt conveyor system, one or more planes below or above the plane of the belt conveyor system with at least one strip;
   g) then moving the traveling tripper, connecting belt bridge and stacker to the other side of the belt conveyor system after filling said one side of the belt conveyor system with said at least one strip to fill up corresponding filling strips of one or more planes below or above the plane of the belt conveyor system on the other side of the belt conveyor system.

2. A method in accordance with claim 1, wherein the connecting bridge always conveys the material largely at right angles to the feed direction of the belt conveyor system.

3. A method in accordance with claim 1, wherein the material is conveyed in a dropping or rising manner with the connecting belt bridge.

4. A method in accordance with claim 1, wherein the material is always filled on at least two planes on each side of the belt conveyor system.

5. A method in accordance with claim 4, wherein the filling strips are filled up one after the other with a lower proximate filling strip filled first, followed by lower more distant filling strip filled second, which is at the same lower level as the lower proximate filling strip, an intermediate proximate filling strip is filled third, which is at a level just above the lower proximate filling strip and an intermediate filling strip is filled fourth, which is above the lower proximate filling strip and adjacent to the intermediate proximate filling strip filled third.

6. A method for depositing overburden material from an ore mine on terrain, the method comprising the steps of:
   providing a belt conveyor system located on an intermediate second plane of terrain that has at least three planes arranged parallel to one another;
   transporting the material from outside the terrain using the belt conveyor system;
   providing a traveling tripper for movement along the belt conveyor system; providing a connecting belt bridge which can also be moved along the belt conveyor system;
   transferring the material on one side or the other side of the belt conveyor system, using the traveling tripper, to the connecting belt bridge;
   providing a stacker which can be moved along the belt conveyor system, said stacker having at least two sections, whereby a pick-up belt and a discharge belt are connected in an area of a moving carriage to one another in an articulated manner, so that the discharge belt can be pivoted laterally opposite the moving carriage and/or can be adjusted in height at an end;

transferring the material to the stacker, using the connecting belt bridge;

discharging the material, with the stacker, in extended filling strips one after the other on the various planes below and above the plane of the belt conveyor system;

filling at first, on one side of the belt conveyor system, one or more planes below or above the plane of the belt conveyor system with at least one extended filling strip;

subsequent to said step of filling at first, moving the traveling tripper, the connecting belt bridge and the stacker to the other side of the belt conveyor system to fill with corresponding filling strips.

7. A method in accordance with claim 6, wherein the connecting bridge always conveys the material at or substantially at right angles to the feed direction of the belt conveyor system.

8. A method in accordance with claim 7, wherein the material is conveyed in a dropping or rising manner with the connecting belt bridge.

9. A method in accordance with claim 6, wherein the pick-up belt can be pivoted laterally opposite the moving carriage.

10. A method in accordance with claim 6, wherein the material is always filled on at least two planes on each side of the belt conveyor system.

11. A method in accordance with claim 10, wherein the filling strips are filled up one after the other with a lower proximate filling strip filled first, followed by lower more distant filling strip filled second, which is at the same lower level as the lower proximate filling strip, an intermediate proximate filling strip is filled third, which is at a level just above the lower proximate filling strip and an intermediate filling strip is filled fourth, which is above the lower proximate filling strip and adjacent to the intermediate proximate filling strip filled third.

12. A method in accordance with claim 1, wherein said at least three planes includes a first plane, said second plane and a third plane, said first plane being located at a position below said second plane, said third plane being located at a position above said first plane.

13. A method in accordance with claim 6, wherein a first plane of said at least three planes is located at a position below said intermediate second plane and a third plane of said at least three planes is located at a position above said intermediate second plane.

14. A method in accordance with claim 1, wherein each of said filling strips extends in a longitudinal direction of said belt conveyor system.

15. A method in accordance with claim 6, wherein each of said filling strips extends in a longitudinal direction of said belt conveyor system.

16. A method for depositing terrain with material, the method comprising:

providing that the terrain has at least 3 planes arranged parallel to one another;

providing a belt conveyor system located on at least the second plane and transporting material from outside the terrain;

providing a traveling tripper for movement along the entire belt conveyor system, with which the material is transferred on one side or the other side of the belt conveyor system to a connecting belt bridge which can also be moved along the belt conveyor system;

using the connecting belt bridge to transfer the material to a stacker which can likewise be moved along the belt conveyor system;

discharging the material with the stacker in extended filling strips one after the other on the various planes below and above the plane of the belt conveyor system;

filling at first, on one side of the belt conveyor system, one or more planes below or above the plane of the belt conveyor system with at least one strip;

then moving the traveling tripper, connecting belt bridge and stacker to the other side of the belt conveyor system after filling said one side of the belt conveyor system with said at least one strip to fill up corresponding filling strips of one or more planes below or above the plane of the belt conveyor system on the other side of the belt conveyor system, wherein at least one plane is provided on one side of said belt conveyor system, wherein the filling strips are filled up one after the other with a lower proximate filling strip filled first, followed by lower more distant filling strip filled second, which is at the same lower level as the lower proximate filling strip.

17. A method in accordance with claim 16, wherein at least another plane is provided on said one side of said belt conveyor system, wherein an intermediate proximate filling strip is filled third, which is at a level just above the lower proximate filling strip and an intermediate filling strip is filled fourth, which is above the lower proximate filling strip and adjacent to the intermediate proximate filling strip filled third.

18. A method for depositing terrain with material, the method comprising:

providing that the terrain has at least three planes arranged parallel to one another;

providing a belt conveyor system located on at least the second plane and transporting material from outside the terrain;

providing a traveling tripper for movement along the entire belt conveyor system, with which the material is transferred on one side or the other side of the belt conveyor system to a connecting belt bridge which can also be moved along the belt conveyor system;

using the connecting belt bridge to transfer the material to a stacker which can likewise be moved along the belt conveyor system, said stacker having at least two sections, whereby a pick-up belt and a discharge belt are connected in the area of a middle moving carriage to one another in an articulated manner, so that the discharge belt can be pivoted laterally opposite the middle moving carriage and/or can be adjusted in height at the end;

discharging the material with the stacker in extended filling strips one after the other on the various planes below and above the plane of the belt conveyor system;

filling at first, on one side of the belt conveyor system, one or more planes below or above the plane of the belt conveyor system with at least one strip;

then moving the traveling tripper, connecting belt bridge and stacker to the other side of the belt conveyor system to fill up the corresponding filling strips there as well.

19. A method for depositing terrain with material, the method comprising:

providing that the terrain has at least three planes arranged parallel to one another;

providing a belt conveyor system located on at least the second plane and transporting material from outside the terrain;

providing a traveling tripper for movement along the entire belt conveyor system, with which the material is transferred on one side or the other side of the belt conveyor system to a connecting belt bridge which can also be moved along the belt conveyor system;

using the connecting belt bridge to transfer the material to a stacker which can likewise be moved along the belt conveyor system;

discharging the material with the stacker in extended filling strips one after the other on the various planes below and above the plane of the belt conveyor system;

filling at first, on one side of the belt conveyor system, one or more planes below or above the plane of the belt conveyor system with at least one strip;

then moving the traveling tripper, connecting belt bridge and stacker to the other side of the belt conveyor system after filling said one side of the belt conveyor system with said at least one strip to fill up corresponding filling strips of one or more planes below or above the plane of the belt conveyor system on the other side of the belt conveyor system, wherein the material is always filled on at least two planes on each side of the belt conveyor system, said filling strips being filled up one after the other with a lower proximate filling strip filled first, followed by lower more distant filling strip filled second, which is at the same lower level as the lower proximate filling strip, an intermediate proximate filling strip is filled third, which is at a level just above the lower proximate filling strip and an intermediate filling strip is filled fourth, which is above the lower proximate filling strip and adjacent to the intermediate proximate filling strip filled third.

20. A method for depositing overburden material from an ore mine on terrain, the method comprising the steps of:

providing a belt conveyor system located on an intermediate second plane of terrain that has at least three planes arranged parallel to one another;

transporting the material from outside the terrain using the belt conveyor system;

providing a traveling tripper for movement along the belt conveyor system;

providing a connecting belt bridge which can also be moved along the belt conveyor system;

transferring the material on one side or the other side of the belt conveyor system, using the traveling tripper, to the connecting belt bridge;

providing a stacker which can be moved along the belt conveyor system;

transferring the material to the stacker, using the connecting belt bridge;

discharging the material, with the stacker, in extended filling strips one after the other on the various planes below and above the plane of the belt conveyor system;

filling at first, on one side of the belt conveyor system, one or more planes below or above the plane of the belt conveyor system with at least one extended filling strip;

subsequent to said step of filling at first, moving the traveling tripper, the connecting belt bridge and the stacker to the other side of the belt conveyor system to fill with corresponding filling strips, wherein the material is always filled on at least two planes on each side of the belt conveyor system, said filling strips being filled up one after the other with a lower proximate filling strip filled first, followed by lower more distant filling strip filled second, which is at the same lower level as the lower proximate filling strip, an intermediate proximate filling strip is filled third, which is at a level just above the lower proximate filling strip and an intermediate filling strip is filled fourth, which is above the lower proximate filling strip and adjacent to the intermediate proximate filling strip filled third.

\* \* \* \* \*